C. W. ABBOTT.
CIRCUIT EXTENSION BOX.
APPLICATION FILED FEB. 8, 1913.
1,065,493.
Patented June 24, 1913.
2 SHEETS—SHEET 2.
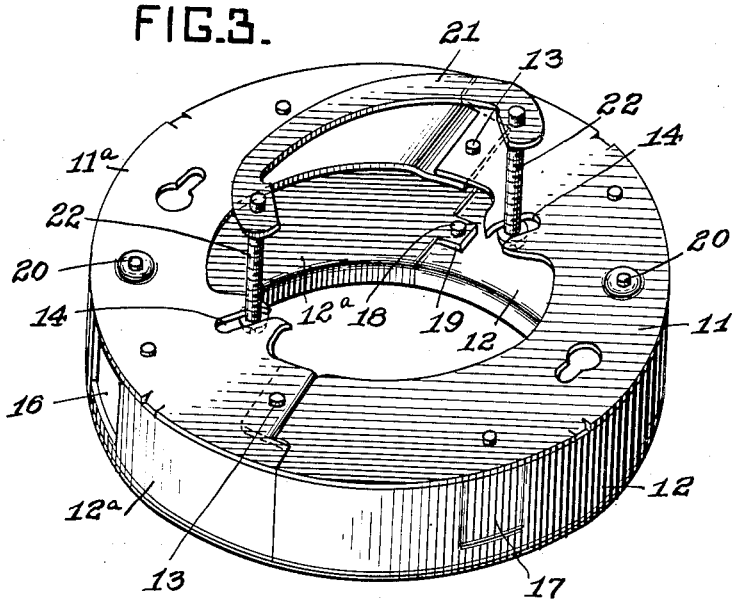
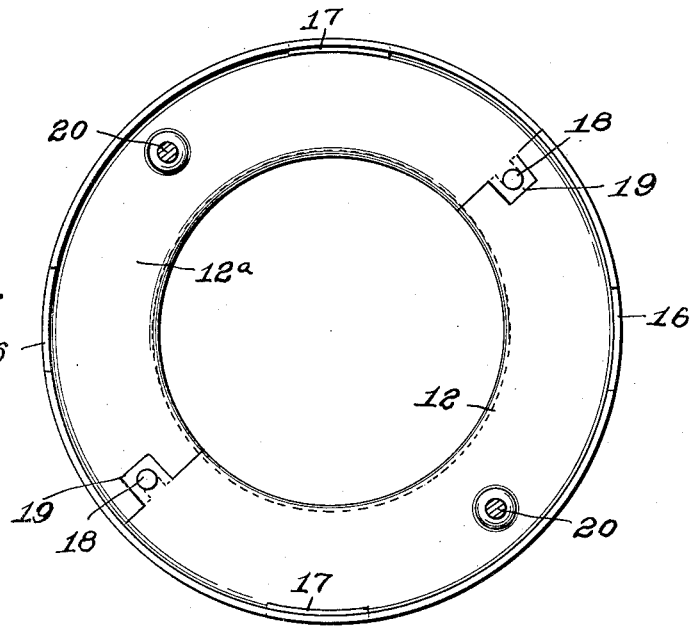
WITNESSES:
INVENTOR

UNITED STATES PATENT OFFICE.

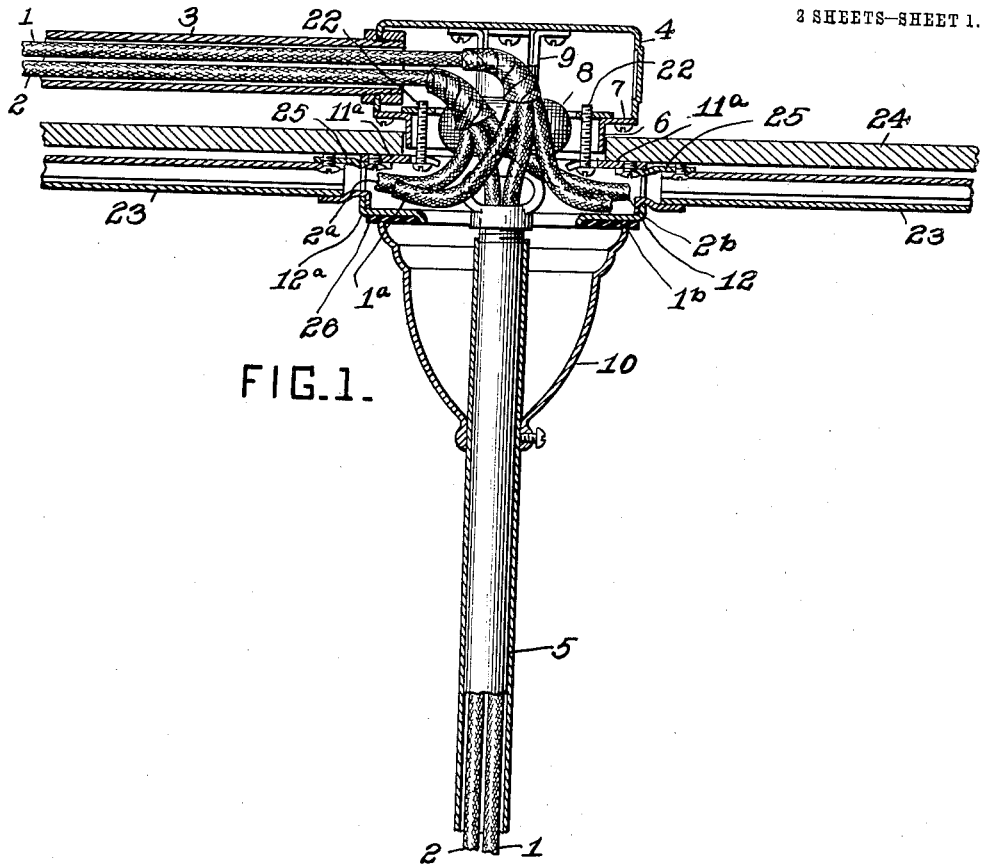
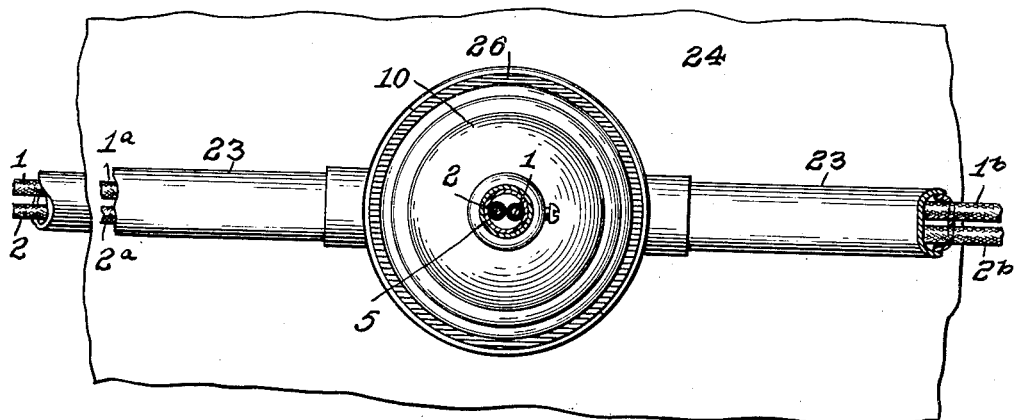

CHAUNCEY W. ABBOTT, OF AUBURN, NEW YORK, ASSIGNOR TO NATIONAL METAL MOLDING COMPANY, OF PITTSBURGH, PENNSYLVANIA, A CORPORATION OF PENNSYLVANIA.

CIRCUIT-EXTENSION BOX.

1,065,493.   Specification of Letters Patent.   Patented June 24, 1913.

Application filed February 8, 1913. Serial No. 747,050.

*To all whom it may concern:*

Be it known that I, CHAUNCEY W. ABBOTT, residing at Auburn, in the county of Cayuga and State of New York, a citizen of the United States, have invented or discovered certain new and useful Improvements in Circuit-Extension Boxes, of which improvements the following is a specification.

It is frequently desirable, in buildings wired for electric lighting and like purposes, to change the location of, or to provide new, electrical fixtures. In effecting such alterations the circuits for the relocated or new fixtures are usually picked up at points where the original circuits are readily accessible, as at bracket or chandelier outlets, and are extended in surface conduits.

My invention has to do with such extensions of electrical circuits, and the object thereof is to provide an extension box whereby a circuit may be picked up and extended from electrical conductor outlet boxes to which chandeliers or brackets are secured, without removing such chandelier or bracket in making the installation.

In the accompanying drawing, which forms part of my specification, I have illustrated an embodiment of my invention.

Figure 1 is a sectional view through a ceiling showing a complete installation of my extension box; Fig. 2 is a bottom plan view of the installation shown in Fig. 1; Fig. 3 is a perspective view of the circuit extension box completely assembled with the means for connecting it to the outlet box; and Fig. 4 is a face or bottom plan view of the extension box.

In the several figures like numerals are used to designate like parts.

The part of the installation, shown in Fig. 1, present before the extension of the circuits through surface conduits, consists of the electrical conductors 1, 2 (carried by the inner wall conduit 3), the outlet-box 4, the chandelier-supporting conduit 5, and the canopy 10. Outlet boxes used for such purposes are usually provided with an annular collar 6 which extends through the opening in the ceiling or wall, and a shelf 7 is formed between the side walls of the box and the inner end of such collar, as shown. The conduit 5 is suspended from the bottom of the box 4 in the usual manner, there being an insulation joint 8 between the connecting-member 9 and said conduit. In order to pick up and extend a circuit from such a point of access to the orginally installed conductors, I provide an extension box, adapted to be connected to the outlet-box 4 without removing the conduit 5 or otherwise disturbing the original installation, such extension box also being adapted to receive or have connected thereto surface conduits for carrying the extended circuits. The box which I preferably employ for this purpose is illustrated to enlarged scale in Fig. 3 of the drawings, and consists of a flat two-part bottom portion 11, 11ª and a two-part cover portion 12, 12ª. The parts of the bottom portion 11, 11ª are suitably crimped so that, when united by screws 13, a plane face will be formed adjacent to the wall or ceiling; and suitable open-ended slots 14 are formed in said bottom portion to receive the screws 22, as hereinafter explained. The cover portion 12, 12ª has side-wall openings 16 or knock-outs 17 to receive the surface conduits, and the parts of said cover are connected together by means of screws 18 extending through suitably provided lugs 19. Screws 20 extending through the cover portion 12, 12ª, and engaging the bottom portion 11, 11ª may be used to connect the said parts.

In order to connect the extension box to the outlet box 4, when such outlet-box has no lugs or other means of attachment, I provide a curved clamping strip 21, adapted to extend around one side of the joint 8, and to bear at its ends upon the outlet-box shelf 7. The ends of such strip are provided with screw-threaded holes to receive screws 22, the heads of which engage the bottom portion 11, 11ª through the slots 14 as shown.

The illustrative embodiment of my invention shows two supplemental circuits extended from a single outlet box through two-piece surface or molding conduits 23. In making such an installation, the canopy 10 is first loosened and slipped down the conduit 5 leaving the opening in the ceiling 24 uncovered and the conductors 1, 2 accessible, so that the branch conductors 1ª, 1ᵇ and 2ª, 2ᵇ may be readily spliced to the conductors 1 and 2, respectively. The flat bottom portion 11, 11ª of the extension box may then be placed around the depending conduit 5 and the two parts of such portion connected together by screws 13, after which such bottom portion may be clamped to the outlet box by the strip 21. Before placing such strip in position the screws 22 may be partly inserted therein, and may be suitably tightened after having been inserted in the slots 14 of the bottom 11, 11ª. When the assembling has been thus far effected the bottom members of the two-piece conduits 23 may be secured to the extension box bottom 11, 11ª by means of suitable connecting lugs 25, the branch conductors 1ª, 1ᵇ, 2ª, 2ᵇ laid in such conduit members, and the top members of said conduits snapped upon the bottom members. The parts of the cover portion 12, 12ª may then be connected together around the conduit 5 by means of screws 18, and said cover portion as a whole secured to the bottom 11, 11ª by screws 20. The canopy 10 may then be slipped along the conduit 5 until the upper end thereof bears upon the cover 12, 12ª, a suitable insulation gasket 26 being interposed between said canopy and cover as shown.

I claim as my invention:

1. The combination with an outlet box for electrical conductors secured within a wall, and a conductor conduit extending from such box and sustaining an electrical fixture; of a circuit extension box consisting of a flat two-part bottom portion adapted to rest upon the surface of the wall adjacent to the opening therein, and a two-part cover portion having side walls and forming an opening around said conduit, means for securing said bottom portion to said outlet-box, and means for securing said cover portion to said bottom portion.

2. The combination with an outlet-box for electrical conductors secured within a wall, and having an annular shelf adjacent to an opening therein, and a conductor conduit extending through said opening; of a circuit extension box consisting of a flat bottom portion and a cover adapted to be secured to said bottom portion, a clamping strip bearing at its opposite ends upon said outlet-box shelf, and clamping members engaging said strip and the bottom portion of said extension box.

3. The combination with an outlet-box for electrical conductors secured within a wall and having an annular shelf adjacent to an opening therein, and a conductor conduit extending through said opening; of a circuit extension box consisting of a bottom and cover portions, a curved clamping strip bearing at its opposite ends upon said outlet-box shelf, and screws engaging said strip and the bottom portion of said extension box, said bottom portion being provided with open-ended slots to receive said screws.

4. The combination with an outlet-box for electrical conductors secured within a wall and having an annular shelf adjacent to an opening therein, and a conductor conduit extending through said opening, of a circuit extension box consisting of a two-part flat bottom portion and a two-part cover portion, said several box parts forming an opening around said conduit, a curved clamping strip bearing at its opposite ends upon said outlet-box shelf, and screws engaging said strip and the bottom portion of said extension box, said bottom portion being provided with open-ended slots to receive said screws.

In testimony whereof I have hereunto set my hand.

CHAUNCEY W. ABBOTT.

Witnesses:
GEO. L. GUION,
A. M. DONNELLY.